United States Patent
Hack

(10) Patent No.: US 11,029,089 B2
(45) Date of Patent: Jun. 8, 2021

(54) APPARATUS FOR THE TEMPERATURE CONTROL OF OBJECTS, IN PARTICULAR FOR DRYING COATED VEHICLE BODIES

(71) Applicant: EISENMANN SE, Boeblingen (DE)

(72) Inventor: Eduard Karl Hack, Holzgerlingen (DE)

(73) Assignee: EISENMANN SE, Böblingen (DE)

( * ) Notice: Subject to any disclaimer, the term of this patent is extended or adjusted under 35 U.S.C. 154(b) by 0 days.

(21) Appl. No.: 15/763,521

(22) PCT Filed: Sep. 27, 2016

(86) PCT No.: PCT/EP2016/073018
§ 371 (c)(1),
(2) Date: Mar. 27, 2018

(87) PCT Pub. No.: WO2017/055301
PCT Pub. Date: Apr. 6, 2017

(65) Prior Publication Data
US 2018/0274859 A1    Sep. 27, 2018

(30) Foreign Application Priority Data
Sep. 29, 2015    (DE) .................... 10 2015 012 466.8

(51) Int. Cl.
*F26B 21/06*    (2006.01)
*F26B 21/04*    (2006.01)
(Continued)

(52) U.S. Cl.
CPC .............. *F26B 21/06* (2013.01); *F26B 21/04* (2013.01); *F26B 23/002* (2013.01);
(Continued)

(58) Field of Classification Search
CPC ........ F26B 21/06; F26B 21/04; F26B 23/002; F26B 23/022; F26B 2210/12; Y02P 70/405
See application file for complete search history.

(56) References Cited

U.S. PATENT DOCUMENTS 4,263,722 A * 4/1981 Botkins .................. F26B 21/04
                                                        34/169
4,499,911 A * 2/1985 Johnson .................. A24B 1/02
                                                        131/302
(Continued)

FOREIGN PATENT DOCUMENTS

| CN | 104 056 765 | 9/2014 |
|----|-------------|--------|
| CN | 104 583 699 | 4/2015 |

(Continued)

*Primary Examiner* — David J Laux
(74) *Attorney, Agent, or Firm* — Schroeder Intellectual Property Law Group, LLC

(57) ABSTRACT

An apparatus and method for the temperature control of objects, in particular for drying coated vehicle bodies, with a temperature control chamber with at least one lock region, a fresh air device for producing fresh air which can be supplied to the temperature control chamber, a circulating air device which extracts exhaust air from the temperature control chamber and produces circulating air which can be supplied to the temperature control chamber, an air intake device for supplying air to the temperature control chamber, and a control device. A fresh air volume flow and a circulating air volume flow can be supplied to the air intake device, and the control device is configured to control the fresh air volume flow and the circulating air volume flow in such a manner that the overall volume flow which is supplied to the temperature control chamber does not fall below a lower limit.

13 Claims, 3 Drawing Sheets

(51) Int. Cl.
  *F26B 23/00*    (2006.01)
  *F26B 23/02*    (2006.01)
(52) U.S. Cl.
  CPC ........ *F26B 23/022* (2013.01); *F26B 2210/12* (2013.01); *Y02P 70/10* (2015.11)

(56) References Cited

U.S. PATENT DOCUMENTS

| | | | |
|---|---|---|---|
| 7,624,740 B2* | 12/2009 | Lipscomb | A24B 1/02 |
| | | | 131/303 |
| 9,423,179 B2 | 8/2016 | Wieland et al. | |
| 9,909,806 B2* | 3/2018 | Schwerer | F26B 23/022 |
| 2015/0121720 A1* | 5/2015 | Wieland | F26B 15/14 |
| | | | 34/493 |
| 2015/0367371 A1* | 12/2015 | Fernholz | B05B 16/60 |
| | | | 454/53 |

FOREIGN PATENT DOCUMENTS

| | | |
|---|---|---|
| DE | 102008012792 | 9/2009 |
| DE | 102008034746 | 2/2010 |
| DE | 10 2009 021 004 | 10/2010 |
| DE | 102012003299 | 8/2013 |
| DE | 10 2012 207 312 | 11/2013 |
| DE | 10 2012 023 457 | 6/2014 |
| DE | 102013004136 | 9/2014 |
| EP | 2 775 241 | 9/2014 |
| WO | 2010/122121 | 10/2010 |

* cited by examiner

APPARATUS FOR THE TEMPERATURE CONTROL OF OBJECTS, IN PARTICULAR FOR DRYING COATED VEHICLE BODIES

RELATED APPLICATIONS

This application is a national phase of International Patent Application No. PCT/EP2016/073018 filed Sep. 27, 2016, which claims priority to German Patent Application No. 10 2015 012 466.8 filed Sep. 29, 2015, the contents of both of which are incorporated herein by reference.

BACKGROUND OF THE INVENTION

1. Field of the Invention

The invention relates to an apparatus for the temperature control of objects, in particular for drying coated vehicle bodies.

2. Description of the Prior Art

The invention will be described in the following text predominantly with reference to vehicle bodies as objects. However, the invention also relates to apparatuses for other objects which have to be temperature controlled in a production process. The term "temperature control" is understood to mean bringing about a temperature change of an object. Here, this can be a temperature increase or a temperature reduction. "Temperature controlled air" is understood to mean air which has the temperature which is required for the temperature control of the object.

Vehicle bodies are frequently heated in the automotive industry, in order to remove moisture from vehicle bodies or to dry the coating of a vehicle body of this type. It goes without saying that moist objects other than vehicle bodies or the coating of other objects can also be dried.

The term "drying" is intended to comprise all operations in which the coating of vehicle bodies, in particular a paint, is cured, whether this is by way of solvents being expelled or by way of the coating substance being crosslinked or the like.

Temperature control or drying plants are usually part of painting or coating plants, are positioned downstream of said processes, and serve to dry, burn in and/or cure coatings or adhesives on objects such as vehicle bodies, for example. A drying plant of this type requires considerable quantities of energy on account of the size of the objects and the required temperatures.

SUMMARY OF THE INVENTION

It is an object of the invention to specify an apparatus for the temperature control of objects, for example for drying coated vehicle bodies, which apparatus has an improved energy consumption.

The object is achieved by way of an apparatus for the temperature control of objects having a temperature control space with at least one air lock region, a fresh air device for producing fresh air which can be fed to the temperature control space, a recirculating air device which removes temperature control space waste air from the temperature control space and produces recirculating air which can be fed to the temperature control space, a feed air device for feeding air to the temperature control space, and a control device, it being possible for a fresh air volumetric flow and a recirculating air volumetric flow to be fed to the feed air device, and the control device being set up to control the fresh air volumetric flow and the recirculating air volumetric flow in such a way that the overall volumetric flow which is fed to the temperature control space and comprises the fresh air volumetric flow and the recirculating air volumetric flow does not undershoot a lower limit. The object is also achieved by way of a method for controlling an apparatus for the temperature control of objects wherein an existing or future loading of the temperature control space is detected and a ratio between the fresh air volumetric flow and the recirculating volumetric flow is set in a manner which is dependent on the loading in such a way that the overall volumetric flow which is fed overall to the temperature control space and the fresh air volumetric and the recirculating volumetric flow does not undershoot a lower limit. Further refinements of the invention are specified in the further aspects of the invention.

The apparatus according to the invention for the temperature control of objects has a temperature control space, that is to say, for example, a drying space, with at least one air lock region. Furthermore, a fresh air device for producing fresh air which can be fed to the temperature control space and a recirculating air device are provided. In the present application, the term "recirculating air device" is understood to mean a device which removes temperature control space waste air from the temperature control space and produces recirculating air which can be fed to the temperature control space. Here, all of the removed temperature control space waste air or only a part of the removed temperature control space waste air can be fed to the temperature control space again.

Furthermore, the apparatus has a control device and a feed air device for feeding air to the temperature control space. The feed air device can comprise, for example, suitable pipework, suitable nozzles, fans, mixing apparatuses or mixing regions.

A fresh air volumetric flow which is produced by the fresh air device and a recirculating air volumetric flow which is produced by the recirculating air device can be fed to the feed air device. The control device is set up to control the fresh air volumetric flow and the recirculating air volumetric flow in such a way that the overall volumetric flow which is fed to the temperature control space and comprises the fresh air volumetric flow and the recirculating air volumetric flow does not undershoot a lower limit.

The overall volumetric flow which is introduced into the temperature control space is therefore composed of the fresh air volumetric flow and the recirculating air volumetric flow. In order to control the overall volumetric flow in the case of a necessary reduction of the fresh air volumetric flow, for example, the control device can increase the proportion of the recirculating air volumetric flow in the overall volumetric flow and thus keep the overall volumetric flow above a lower limit. A reduction of the fresh air volumetric flow can take place, for example, in the case of a reduction in the temperature control performance of the apparatus. At the same time, an increase of the fresh air volumetric flow can be compensated for by way of a reduction of the recirculating air volumetric flow. If the temperature control performance of the apparatus is reduced, less waste air to be discharged is produced overall, which in turn requires a reduced feed of fresh air.

It can be provided in one preferred embodiment of the invention that the overall volumetric flow can be fed in via the air lock region. At the same time, the overall volumetric flow which is fed into the temperature control space can serve to establish and maintain the air lock function. An assistance of the fresh air volumetric flow by way of the recirculating air volumetric flow for maintaining the overall volumetric flow can therefore stabilize and secure the air lock functionality.

It can be provided in one further development of the invention that the control device is set up to keep the overall volumetric flow constant. By way of a constant overall volumetric flow, the air lock action remains constant and therefore effective. It is particularly preferred if a volumetric flow which is introduced into the air locks is kept constant, as a result of which a condensation of temperature control space air constituent parts or a breakdown of the air lock action is prevented. The air locks serve to protect the inner regions of the temperature control space, in which the objects are heated to the drying temperature, against the outflow of warm temperature control space air. An outflow of warm air, for example, into an adjoining cooling zone would lead to an undesired condensate formation in the cooling zone. The part volumetric flow in the air lock can be kept constant by way of the feed of the heated fresh air into the air lock region, which feed is regulated according to the invention.

It can be provided in one development of the invention that the control device is set up to keep the volumetric flow which relates to the temperature control space in its entirety constant. The volumetric flow which relates to the temperature control space can be composed of a volumetric flow which is fed in and a volumetric flow which is circulated, and can likewise be kept constant, for example with the variation of the proportions of circulated temperature control space air and/or fresh air which is fed in.

The apparatus advantageously comprises a heating device, in which all of the removed waste air or a part of the removed waste air can be heated to form a heated air volumetric flow and can be fed to the recirculating air volumetric flow. Depending on the configuration of the apparatus, the heating device can be one or more conventional heating registers, a thermal afterburning means or similar plants.

One particularly preferred embodiment of the invention provides that the control device controls the feed of fresh air in a manner which is dependent on the loading of the temperature control space. In the case of an adaptation of the temperature control performance of the apparatus for the temperature control of objects to the loading of the temperature control space, it can be necessary to reduce the fresh air feed into the temperature control space, as has already been described. By way of the supplementing of the fresh air volumetric flow which is fed into the temperature control space by way of the recirculating air volumetric flow, there is the possibility at the same time to keep the air lock function stable and functional independently of the fresh air feed.

One specific refinement of the invention provides that the recirculating air device has an afterburning device, it being possible for temperature control space waste air to be fed to the afterburning device for thermal aftertreatment. The temperature control space is designed in such a way that the objects to be temperature controlled can as a rule be conveyed through the temperature control space by means of a conveying device. During the temperature control operation, organic compounds can escape from the objects to be temperature controlled, for example from applied coatings such as paints or adhesives. For this purpose, the apparatus has the afterburning device. For the thermal aftertreatment, temperature control space waste air of the temperature control space can be fed to the afterburning device. The organic compounds which are contained in the temperature control space waste air and are also called VOC (volatile organic compounds) can oxidize and the waste air can thus be purified by way of the thermal burning operation which takes place, for example, at temperatures above 500° C., for example at from 500 to 700° C., and as a rule uses fuels. Here, regenerative or recuperative waste air preheating or catalytic converters can also be used for oxidation at low temperatures.

Furthermore, the fresh air device has a fresh air heat exchanger. The fresh air heat exchanger has a fresh air feed line and a fresh air discharge line, and is designed to temperature control fresh air which can be fed to the temperature control space by means of waste air of the afterburning device. The fresh air heat exchanger can be integrated into the fresh air feed line. The quantity of fresh air which is sucked in, for example, through a fan, can be controlled, for example, by means of butterfly valves downstream of a fan of this type, by means of an inlet guide vane on the fan or by means of a frequency converter on the fan, which frequency converter regulates the rotational frequency of the fan. In order to keep the overall volumetric flow constant, the temperature control space recirculating air proportion and/or the temperature control space waste air proportion of the overall volumetric flow has to be increased at the same time by way of, for example, a reduction of the fresh air proportion.

The temperature control space has at least one temperature control space section, as a rule a plurality of temperature control space sections. Each temperature control space section has in each case at least one temperature control space waste air removal and return device. A part of the temperature control space waste air is guided via a temperature control space section heat exchanger. Another part of the temperature control space waste air is fed to the afterburning device. The temperature control space section and the temperature control space section heat exchanger are connected in such a way that temperature control space air can be removed from the temperature control space section, can be guided through the temperature control space section heat exchanger for temperature control, and can be fed to the temperature control space section. Therefore, the temperature control space air can be fed in a circuit again to the temperature control space section as a circulating air flow. Depending on the configuration of the apparatus, the feed of the temperature control space air which is removed from the temperature control space can take place directly in the temperature control space section, from which the temperature control space air has been removed. As an alternative or in addition, the removed temperature control space air can be fed in again centrally or at edge sections of the temperature control space, for example also as air lock air. A part of the temperature control space waste air which is purified via the afterburning device leaves the painting plant as waste gas. The waste heat of the afterburning device is utilized in the fresh air heat exchanger, in order to heat the fresh air.

It is provided according to the invention that the temperature control space waste air which is temperature controlled by means of the temperature control space section heat exchanger can be fed via a line from the temperature control space section heat exchanger to the fresh air which is temperature controlled by means of the fresh air heat exchanger.

The return of the temperature controlled temperature control space waste air fundamentally provides the possibility of keeping the volumetric flow which is guided through the temperature control space within a fixed range during the operation of the apparatus, even if a lower temperature control performance is to be provided in the temperature control space during certain time periods on account of fewer objects to be temperature controlled. The heating of the objects to be temperature controlled takes place by way of convective heat transfer from the heated temperature control space recirculating air. The performance of a temperature control apparatus is as a rule conceived according to how large the surfaces to be temperature controlled are. The type of the surfaces $A_n$ to be temperature controlled and/or the size thereof determine how many organic compounds (VOC) are released during the temperature control process within the temperature control space. If a temperature control space has a capacity of n objects, for example vehicle bodies, with a corresponding surface $A_n$, the temperature control apparatus is situated in full load operation if n objects are situated in the temperature control space. In the case of fewer objects, for example n–i (i=1 . . . n), the temperature control space can operate in part load operation. In the case of n–i objects, correspondingly fewer organic compounds are released, with the result that a greater proportion of the temperature control space waste air can be fed as recirculating air to the fresh air. Therefore, in particular in the case of a suitable mixture of the returned temperature controlled temperature control space waste air with the temperature controlled fresh air, for example in the case of said mixture being fed into the air locks, the volumetric flow which prevails in the air lock can be kept constant.

Although a lower temperature control performance is associated according to the invention with a lower fresh air feed to the temperature control space, it is then not possible to undershoot a volumetric flow which is necessary for the required circulation of the air quantity which is situated in the temperature control space. Said volumetric flow is ideally kept constant. For example, the air lock function might be impaired or fail completely if a defined volumetric flow in the air lock were undershot. By way of the addition of heated temperature control space waste air, in contrast, the volumetric flows in the air locks or in the temperature control space can be kept constant, and a substantially greater variation of the temperature control performance which correlates with a variation of the fresh air feed at the fresh air heat exchanger can be performed at the same time. This makes particularly efficient operation of the apparatus possible.

It can be provided as an alternative or in addition that the temperature control space waste air which can be fed to the afterburning device can be fed to the fresh air which is temperature controlled by means of the fresh air heat exchanger. In addition to the advantage which has already been addressed above that the return of temperature control space waste air makes an efficiency increase of the apparatus possible as a result of an improved modulating capability of the temperature control performance, this has the additional advantage that a majority of the lines and units which are required in any case for the operation of the afterburning device, such as a fan, can be utilized here too and therefore the installation complexity is lower. In the case of a simultaneous use, for example, of a fan which is used for the feed of afterburning feed air for feeding in a part of said afterburning feed air to the temperature controlled fresh air, has the advantage that the air quantity to be fed in can be set or regulated, for example, by means of simple butterfly valves.

It can be provided in one development of the invention that the line from the temperature control space section heat exchanger is connected to the fresh air discharge line of the fresh air heat exchanger. Mixing in of the temperature control space waste air which has already been heated by way of the temperature control space section heat exchanger therefore takes place downstream of the heat exchanger and can compensate for a possibly reduced volumetric flow in the case of a lower temperature control performance requirement, with the result that there is no change in the volumetric flow in the temperature control space.

It can be provided in a further refinement of the invention that the fresh air discharge line leads from the fresh air heat exchanger to the temperature control space, a fresh air fan is arranged in the fresh air discharge line, and the line from the temperature control space section heat exchanger to the fresh air heat exchanger opens out downstream of the fresh air heat exchanger and upstream of the fresh air fan. The abovementioned advantages also arise here.

One specific development of the invention can provide that the afterburning device has a waste air feed line and a pure air discharge line, a waste air fan is arranged in the waste air feed line between the temperature control space and the afterburning device, and a line is provided from the afterburning device to the fresh air heat exchanger, the line which leads from the afterburning device to the fresh air heat exchanger leading from the waste air feed line to the fresh air discharge line. This makes a configuration possible which is particularly simple and can therefore be realized with reduced complexity.

In one development of the invention, a control device is provided, it being possible for the volumetric flow which is produced by way of the fresh air fan and/or the waste air fan to be controlled or regulated by means of the control device. This is a particularly advantageous possibility for controlling or regulating the volumetric flows which lead through the temperature control space. The control or regulation can take place, for example, by way of the control of the rotational speed of one or both abovementioned fans, by way of actuation of butterfly or throttle valves which are provided on the fans, and/or by way of actuation of air guiding valves in inlet or outlet lines.

In one particularly advantageous refinement of the invention, a transport apparatus can be provided for the objects to be temperature controlled, the control device being set up to adapt parameters which influence the temperature control operation to a loading of the temperature control space. Here, the loading of the temperature control space can comprise a number of objects to be temperature controlled, a size of the objects to be temperature controlled, and/or a condition of the objects to be temperature controlled, and the parameters which influence the temperature control operation can comprise the volumetric flow which is produced by way of the fresh air fan and/or the volumetric flow which is produced by way of the waste air fan, and/or a temperature of the temperature control space. It is therefore possible to influence the volumetric flow through the temperature control space in a simple and inexpensive way.

A rotational speed of a fan, a position of a throttle valve, a position of an air guiding valve and/or a position of a bypass valve can be controlled for influencing the volumetric flow.

It can be provided in one development of the invention that the adaptation of the parameters which influence the temperature control operation takes place in a stepped manner, in particular in a manner which is dependent on the number of objects to be temperature controlled, the surface area of the coating to be dried, or the quantity of the coating to be dried.

BRIEF DESCRIPTION OF THE DRAWINGS

In the following text, exemplary embodiments of the invention will be described in greater detail with reference to the drawings, in which.

DESCRIPTION OF PREFERRED EXEMPLARY EMBODIMENTS

Figure 1:
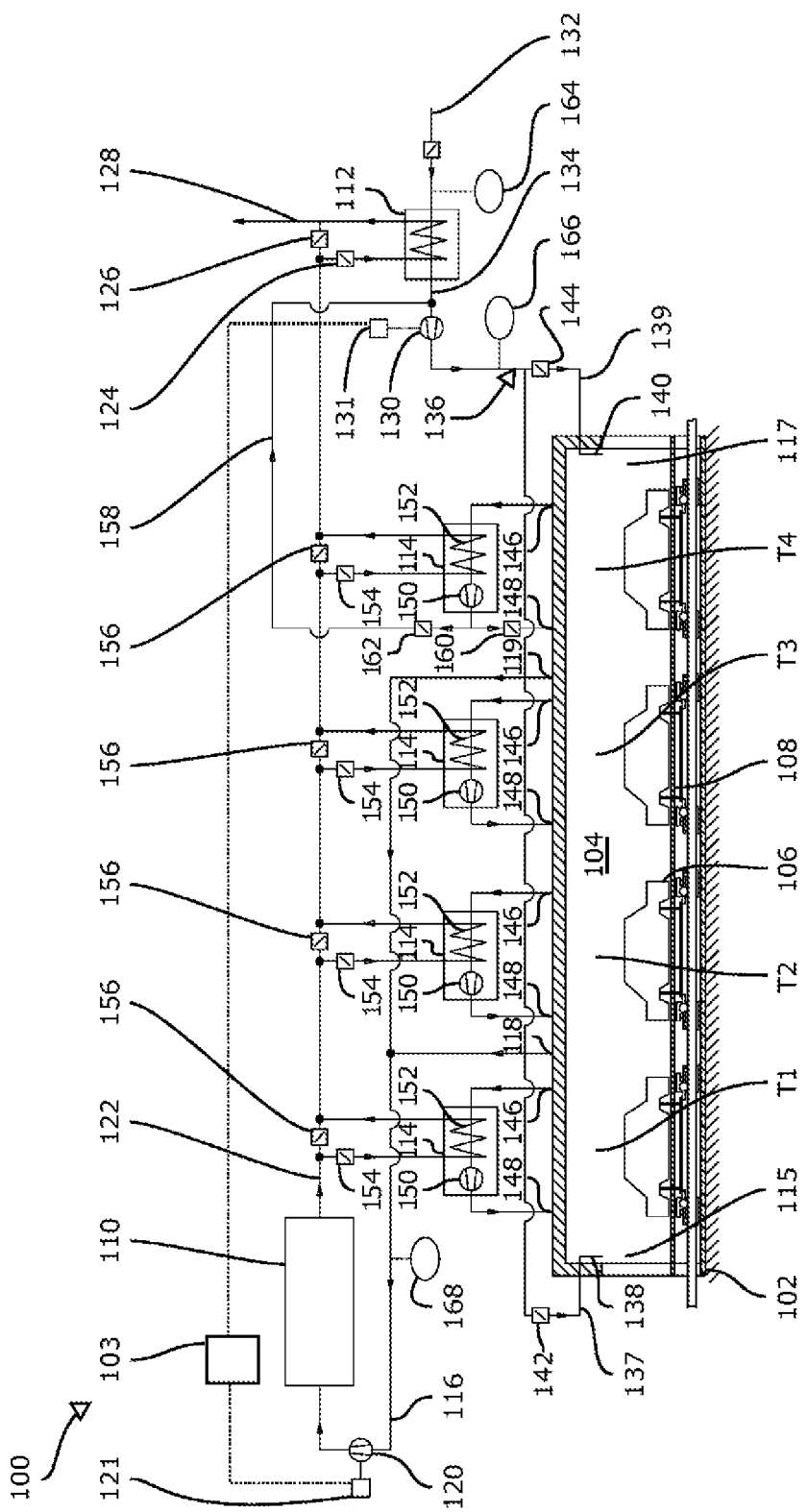
FIG. 1 shows a diagrammatic illustration of a first embodiment according to the invention of an apparatus for the temperature control of objects.

FIG. 1 illustrates one embodiment of an apparatus according to the invention for drying objects in the form of a dryer 100. The dryer 100 has a thermally insulated dryer housing 102, in which a dryer space 104 is accommodated, through which motor vehicle bodies 106 are conveyed in a pass here by way of example. To this end, the dryer 100 comprises a conveying system 108 which is known per se for the vehicle bodies 106.

Heated air is fed to the dryer space 104, in order to dry the vehicle bodies 106 or a coating or adhesive bond which is applied to said vehicle bodies 106. If "drying" is mentioned here and in the following text, this means all operations in which the coating of the vehicle body, in particular paint, can be cured. This can take place, for example, by way of the expulsion of water or solvents or by way of crosslinking of the coating substance.

The dryer 100 comprises a thermal afterburning device 110, a fresh air heat exchanger 112 and a plurality of structurally identical dryer space section heat exchangers 114 which divide the dryer space 104 into a plurality of dryer space sections T1-T4. The number of dryer space sections is selected arbitrarily here and is to be adapted to the individual requirements. The motor vehicle bodies pass through the dryer space sections T1-T4 one after another, and an inlet air lock 115 is provided at the inlet of the dryer space 104 and an outlet air lock 117 is provided at the outlet.

The thermal afterburning device 110 can be a regenerative thermal plant (also called RTO [regenerative thermal oxidizer]) with a gas burner, to which gas burner dryer space waste air from the dryer space 104 is fed by means of a waste air fan 120 via a waste air line 116 with two removal points 118, 119 here by way of example. There can also be only one or more than two removal points. In the afterburning device 110, the dryer space waste air from the dryer space 104 has fuel gas added to it, and said waste air/gas mixture is burnt. The pollutants which are contained in the waste air are rendered harmless by way of the high temperatures which are produced and by way of the combustion operation, for example by way of thermal oxidation.

The pure gas which is obtained by way of heating in the afterburning device 110 can be fed to the fresh air heat exchanger 112 completely or partially via an afterburning discharge line 122, in order that fresh air is heated by way of the heated pure gas. Here, two waste air valves 124, 126 are provided by way of example for controlling the waste air which can be fed to the fresh air heat exchanger 112. Depending on the position of the valves 124, 126, the waste air of the thermal afterburning can be fed completely via a waste air line 128 completely to the fresh air heat exchanger 112, or proportionally to the waste air line 128 and the fresh air heat exchanger 112.

In the present embodiment, the fresh air which is to be fed to the dryer space 104 is sucked in via the fresh air heat exchanger 112 by means of a fresh air fan 130. The fresh air which is still at ambient temperature is fed to the fresh air heat exchanger 112 via a fresh air feed line 132, is temperature controlled there, depending on the position of the valves 124, 126, by means of the heat exchanger 112 by way of a defined volumetric flow of afterburning waste air, and passes via a fresh air heat exchanger discharge line 134 to the fresh air fan 130. After passing the fresh air fan 130, the temperature controlled fresh air passes via a feed air system 136 into the dryer space 104 via its inlet and outlet regions as air lock air. Here, the inlet air lock 115 is supplied via a line 137 and an outlet nozzle 138, and the outlet air lock 117 is supplied via a line 139 and an outlet nozzle 140. Corresponding valves 142, 144 make it possible to control the volumetric flow which is fed to the dryer space 104 via the outlet nozzles.

Waste air which has flowed through the fresh air heat exchanger 112 is output to the surroundings via the waste air line 128.

The temperatures which are necessary for the drying operation are produced in the dryer space 104 by way of the thermal afterburning means 110 which, as a central burning unit, heats the dryer space sections T1-T4 via the dryer space section heat exchangers 114. As an alternative, the dryer space section heat exchangers 114 might also be assigned individual heating units. Each dryer space section heat exchanger 114 is assigned to a dryer space section T1-T4 which is defined by the dryer space 104 and of which the dryer space 104 has a plurality. Each dryer space section T1-T4 thus forms a heating zone. In the present exemplary embodiment, four dryer space sections T1 to T4 and four associated dryer space section heat exchangers 114 are shown by way of example. In the present exemplary embodiment, the dryer space sections T1 to T4 are not separated from one another structurally.

Dryer space waste air is fed to each of the dryer space section heat exchangers 114 by way of an outlet line 146 of the associated dryer space section. A conveying fan 150 is additionally arranged in the dryer space section heat exchanger 114.

The removed dryer space waste air is temperature controlled via a heat exchanger line 152, and is blown into the associated dryer space section T of the dryer space 104 again by way of an inlet line 148. The volumetric flow which is guided through the heat exchanger line 152 can be controlled, for example, via valves 154, 156.

In part load operation of the dryer 100, the heat requirement of the dryer 100 drops. Part load operation can be produced, for example, by virtue of the fact that not all available spaces of the conveying device 108 are occupied by vehicle bodies 106. Other causes for part load operation can be, for example, a different coating material which requires a lower drying temperature or a lower addition of heat, or a lower mass of the objects to be coated and/or of a transport frame, such as a skid, for example. Part load operation of this type is achieved in terms of regulating technology by virtue of the fact that, for example, less dryer space waste air is extracted and correspondingly less dryer space waste air is made available to the central afterburning device 110. This can mean, for example, a reduction in the performance by up to 50%, and can bring about a reduced waste air volumetric flow via the waste air line 122. The associated reduced volume throughput through the dryer space section heat exchangers brings about (in addition to the reduced temperature) a reduced addition of heat and therefore reduced heating of the dryer space 104. At the same time, however, the fresh air volumetric flow which is conveyed through the fresh air heat exchanger 112 also has to be adapted to the reduced afterburning waste air volumetric flow, that is to say has to be reduced. This would result in a reduced volumetric throughput at the air locks 115, 117, which might have a negative influence on the air lock function. In order to counteract this, a dryer space section waste air return line 158 is provided in the exemplary embodiment which is shown in FIG. 1. The line 158 branches off at the outlet of a dryer space section heat exchanger 114, and feeds the dryer space waste air which is removed from the respective dryer space section to the fresh air heat exchanger discharge line 134 as complementary air. Valves 160, 162 are provided to control the volumetric flow which is removed by means of the line 158, via which valves 160, 162 the ratio between the removed volumetric flow and the volumetric flow which is fed directly to the dryer space 104 again can be set. In this way, a considerable part of the fresh air which it is otherwise necessary to feed in and to heat can be saved. At the same time, a constant air lock air volume can be realized at every performance level of the dryer 100. The air tightness of the dryer 100 can therefore be achieved without an otherwise necessary additional fan which would have to maintain the correct function of the air locks 115, 117 at a low performance level.

In this context, it is advantageous, in particular, if the volumetric flow which can be conveyed by way of the fresh air fan 130 can be controlled. This can be realized, for example, by way of an adjustable rotational speed of the fan. Other measures which control the volumetric flow are also conceivable, however, such as control valves or the like. In the case of a direct control of the rotational speed of the fan, it is of particular advantage that a reduction in the rotational speed is as a rule accompanied by a reduction in the power consumption and therefore by an energy saving. The actuability of the fresh air fan 130 is symbolized in FIG. 1 by way of a control/regulating unit 131 which can be capable of being actuated manually, locally by motor, or else centrally by motor or in an automated manner. The central actuability is illustrated by way of a control device 103. The control device 103 is connected to the control/regulating unit 131 and can undertake central control tasks.

It can be particularly advantageous in a comparable way if the waste air fan 120 can be controlled in a similar way with regard to its volume conveying. This is symbolized in FIG. 1 by way of the control/regulating unit 121 which is likewise connected to the control device 103. The control device can be connected to further elements of the dryer, such as the control valves 124, 126, 144, 154, 156, 160, 162.

An adaptation of the fresh air which is fed to the dryer space 104 to the afterburning waste air which can instantaneously be conveyed can be carried out by way of the controllability of the fresh air fan 130 and the waste air fan 120. At the same time, undershooting of the fresh air volumetric flow can be prevented by way of a corresponding increase in the dryer space waste air which is circulated via the line 158.

A regulation of the individual volumetric flows can advantageously take place with the aid of volumetric flow regulators. To this end, for example, a first volumetric flow regulator 164 can be attached in the fresh air feed line 132 upstream of the fresh air heat exchanger 112, a second volumetric flow regulator 166 can be attached downstream of the fresh air fan 130, and a third volumetric flow regulator 168 can be attached in the waste air line 116 upstream of the waste air fan 120.

Figure 2:
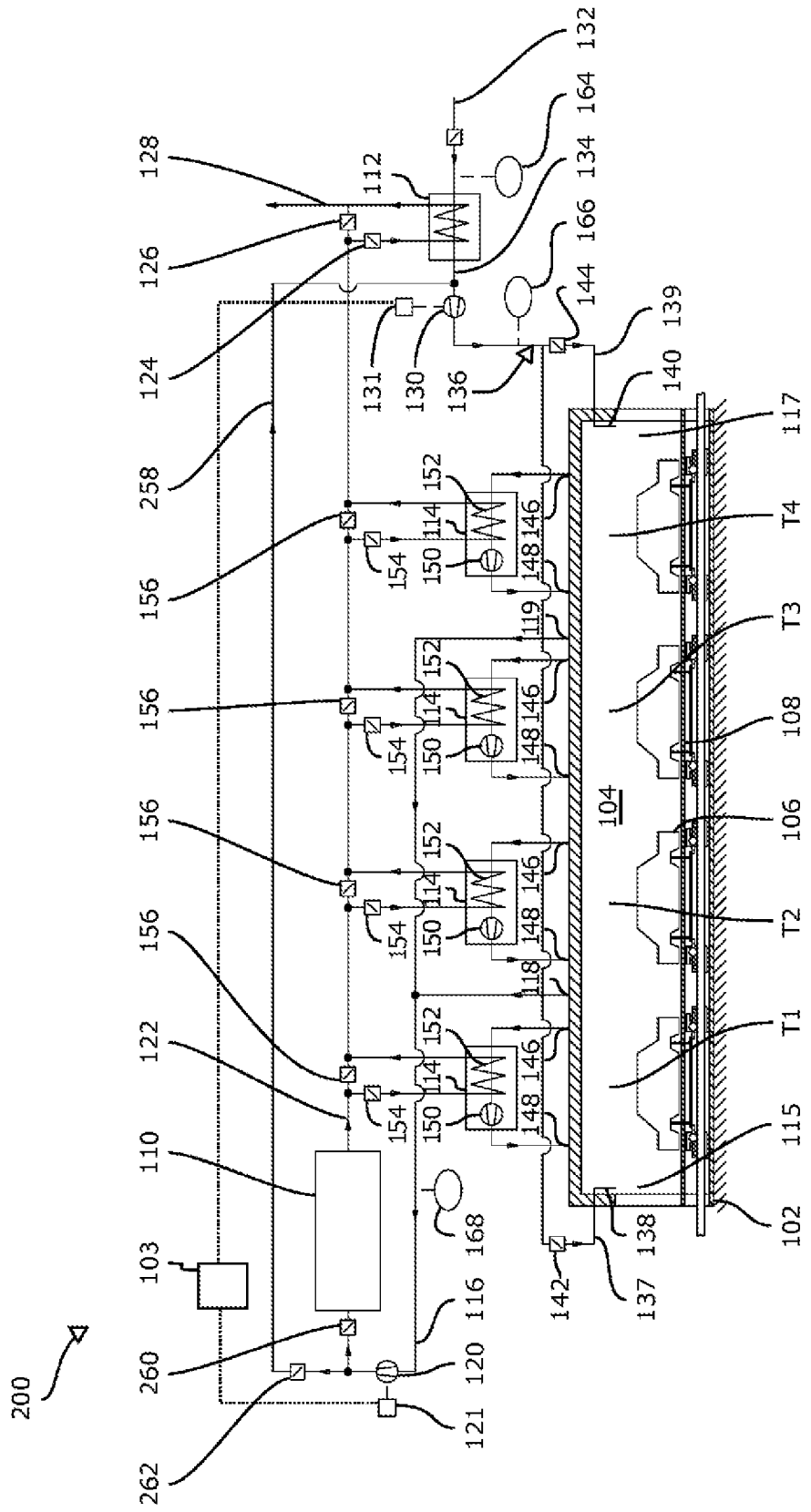
FIG. 2 shows a diagrammatic illustration of a second embodiment according to the invention of an apparatus for the temperature control of objects.

FIG. 2 shows one alternative embodiment to the dryer 100 which is shown in FIG. 21, in the form of a dryer 200. Identical or comparable features are denoted by the same designations. In contrast to the dryer 100 which is shown in FIG. 1, the feed of dryer space waste air in the embodiment which is shown in FIG. 2 is not achieved via the waste air of one of the dryer space section heat exchangers 114, but rather via a branching line 258 in the waste air line 116, that is to say the feed of the waste air to the afterburning device 110. The branching line 258 branches off upstream of the afterburning device 110 and opens, just like the line 158 in the case of the dryer 100, into the fresh air heat exchanger discharge line 134 downstream of the fresh air heat exchanger 112 and upstream of the fresh air fan 130. Via the line 258, a defined proportion of dryer waste air which is removed at the dryer space 104 can be mixed as complementary air into the fresh air which has already been previously temperature controlled.

The proportion of waste air to be mixed in can be set via valves 260, 262.

Figure 3:
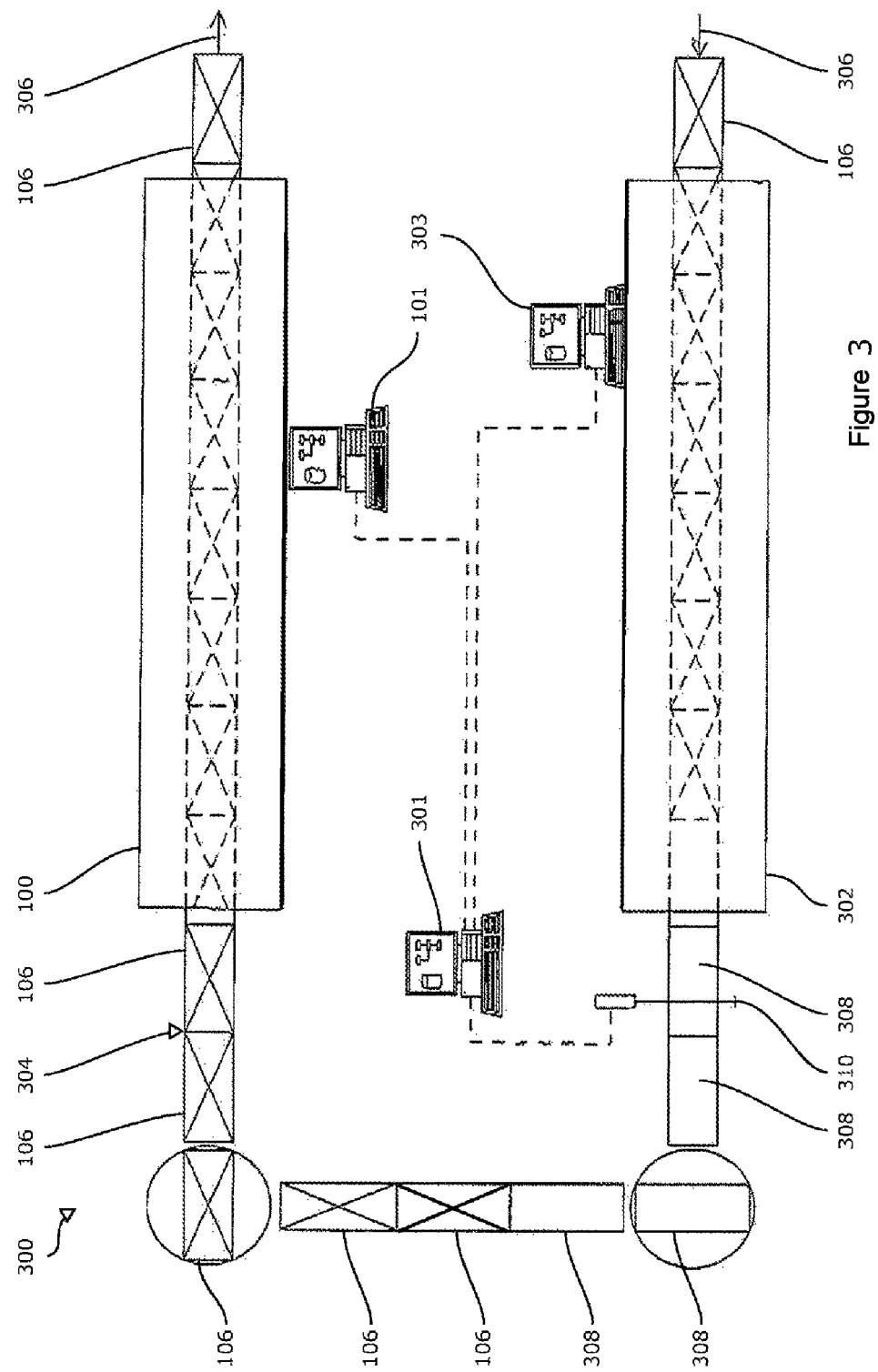
FIG. 3 shows a diagrammatic illustration of a coating plant according to the invention.

FIG. 3 shows a diagrammatic view of a coating plant 300 with, for example, a dryer 100 and a coating device 302, such as a paint booth. The dryer is controlled by way of a dryer controller 101, and the coating device is controlled by way of a coating controller 303. The coating plant 300 is controlled overall by way of a plant controller 301 which for its part is connected to the dryer controller 101 and the coating device controller 303.

A conveying device 304 connects the dryer 100 to the coating device 302. By means of the conveying device 304, vehicle bodies 106 can be conveyed, after a coating operation in the coating device 302, to the dryer 100 in a way which is known per se. Arrows 306 indicate the conveying direction. The conveying device 302 is not occupied completely in the situation which is shown here. Spaces which are identified in a cross-shaped manner are fitted with vehicle bodies 106, and free spaces 308 are identified as empty locations. Said empty locations 308 form free working or production cycles.

FIG. 3 shows a part load situation which possibly occurs and is to be expected for the dryer 100. Whereas, in the operating state which is shown in FIG. 3, the dryer 100 is currently still operating under full load with regard to the occupancy of the conveying device spaces, a part load phase can already be seen by way of the free spaces 308 between the coating device 302 and the dryer 100 and can be prepared for, during which part load phase not all of the possible drying spaces of the dryer 100 will be occupied.

This situation can be modeled in the plant controller 301, for example, by way of a feedback of processes which take place in the coating device 302. As an alternative, a detection device 310 can be provided for determining the situation which is shown in FIG. 3. The detection device 310 is connected to the central plant controller 301 directly or indirectly via the coating device 302, in such a way that free cycles of the dryer 100 which are to be expected for the plant controller 301 can be determined. The detection device can operate mechanically, optically, acoustically or via electromagnetic waves such as, for example, in the case of an RFID scanner. The data, which are obtained, for example, by means of an RFID communication, about the object to be temperature controlled can comprise, for example, information about the type and quantity of the coating, its drying behavior, such as the organic compounds (VOC) which are produced in the process and the parameters which are required for the temperature control operation, such as a surface temperature or a treatment duration.

The determination of a free working cycle ideally takes place so shortly upstream of the dryer 100 that the conveying time corresponds to the reaction time for adjusting to the changing process conditions in the dryer 100.

If the determination of free cycles takes place at a spatially greater spacing from the dryer 100, a corresponding regulating signal can be transferred with a suitable time delay to the dryer controller 101. It can be prevented in this way that process conditions which have already changed in the dryer 100 are set although the loading of the dryer 100 has not yet changed.

It can be provided in one exemplary embodiment of the coating plant of FIG. 3 that an adaptation of the process conditions in the dryer 100 takes place in a stepped manner. Here, a process step change can be, for example, an adaptation of the relevant parameters for a workpiece, for example a vehicle body. A process step change of this type can take place in the upward (that is to say, one additional workpiece) or downward (that is to say, one workpiece fewer) direction.

Here, merely a relative adaptation control operation can take place, in which, if a free cycle is detected at the detection device 310, a process step change in the downward direction in relation to the instantaneous loading state and the associated level of the relevant process parameters. For example, the rotational speed of a participating fan, such as the waste air fan 120, for example, can be reduced and/or the position of an air guiding valve, such as the valves 160 or 162, for example, can be closed or opened by one step. In the case of a further free cycle which is detected or is known to the plant controller 301, a further process step change in the downward direction from the level which then prevails takes place. If, in contrast, no free cycle is detected, since a workpiece on the conveying device 304 is detected at the detection device or is known in some other way to the plant controller 301, and adaptation of the process parameters takes place by one step in the upward direction, once again starting from the current level.

As an alternative or in addition, an absolute adaptation control operation can also be realized. Here, the number of free cycles which are present in a defined time interval is determined over said time interval. The number of free cycles can be from contiguous empty locations on the conveying device or free cycles which are known to the plant controller in some other way, but can also be an "average" free cycle number over a defined time interval. In a case of this type, an adaptation of the process parameters can be performed over a plurality of steps or stages at the same time. For example, in the case of a determined number of four free cycles, an adaptation by four steps or stages can take place. An adaptation of this type can also be necessary in the case of a non-linear behavior of the dryer with regard to the adaptation of individual process parameters.

Both variants of the process parameter adaptation (relative and absolute) can take place only within defined system limits. For example, the minimum necessary air throughput at the dryer, a minimum temperature or defined mixing conditions are a lower limit for possible adaptation ranges. For example, a lower limit of this type can lie at a loading ratio of 50% of the dryer 100.

What is claimed is:

1. An apparatus for the temperature control of objects comprising:
   a temperature control space with at least one air lock region
   a conveying device for conveying objects through the temperature control space, the conveying device comprising available spaces for objects;
   a fresh air device for producing fresh air which can be fed to the temperature control space;
   a recirculating air device which removes temperature control space waste air from the temperature control space and produces recirculating air which can be fed to the temperature control space,
   a feed air device for feeding air to the temperature control space;
   a detection device for detecting empty spaces where no objects are being conveyed on the conveying device; and
   a control device,
   wherein an overall volumetric flow is fed to the temperature control space from the feed air device, the overall volumetric flow comprising a fresh air volumetric flow, and the control device is set up to reduce the temperature and the fresh air volumetric flow in response to empty spaces being detected on the conveying device by the detection device, the control device further being set up to supply the feed air device with a recirculating volumetric flow of recirculating air from the recirculating air device to supplement the fresh air volumetric flow to ensure that the overall volumetric flow does not drop beneath a lower threshold when the temperature in the temperature control space and the fresh air volumetric flow is reduced in response to the apparatus operating at a reduced load.

2. The apparatus as claimed in claim 1, wherein the overall volumetric flow is fed via the at least one air lock region.

3. The apparatus as claimed in claim 1, wherein the control device is set up to keep the overall volumetric flow constant.

4. The apparatus as claimed in claim 1 further comprising a heating device in which at least a portion of the temperature control space waste air removed from the temperature control space can be heated to form a heated air volumetric flow and can be fed into the recirculating air volumetric flow.

5. The apparatus as claimed in claim 1, wherein the control device controls the feed of fresh air in a manner which is dependent on the loading of the temperature control space.

6. The apparatus as claimed in claim 1, wherein
   the recirculating air device has an afterburning device, the temperature control space waste air being fed to the afterburning device for thermal aftertreatment,
   the fresh air device comprises a fresh air heat exchanger with a fresh air feed line and a fresh air discharge line, the fresh air discharge line being connected to the feed air device,
   the temperature control space defines at least one temperature control space section, and
   the recirculating air device has at least one temperature control space section heat exchanger which is assigned the at least one temperature control space section of the temperature control space, the at least one temperature control space section and the at least one temperature control space section heat exchanger being connected in such a way that temperature control space air can be removed from the at least one temperature control space section and guided through the at least one temperature control space section heat exchanger for temperature control purposes, and can be fed back to the temperature control space section, the temperature control space air being fed to the temperature control space section in a circuit as a circulating air flow, wherein the temperature control space air which is temperature controlled by means of the at least one temperature control space section heat exchanger is fed via a line from the temperature control space section heat exchanger to the feed air device, and/or wherein the temperature control space waste air which can be fed to the afterburning device is fed to the feed air device.

7. The apparatus as claimed in claim 6, wherein the line from the at least one temperature control space section heat exchanger is connected to the fresh air discharge line of the fresh air heat exchanger.

8. The apparatus as claimed in claim 6, wherein the fresh air discharge line leads from the fresh air heat exchanger to the temperature control space, the feed air device comprising a fresh air fan, and the line from the at least one temperature control space section heat exchanger to the fresh air heat exchanger opening out downstream of the fresh air heat exchanger and upstream of the fresh air fan.

9. The apparatus as claimed in claim 6, wherein the afterburning device has a waste air feed line and a pure air discharge line, a waste air fan being arranged in the waste air feed line between the temperature control space and the afterburning device, and a line being provided from the afterburning device to the fresh air heat exchanger, the line which leads from the afterburning device to the fresh air heat exchanger leading from the waste air feed line to the fresh air discharge line.

10. The apparatus as claimed in claim 1 further comprising a transport apparatus for objects to be temperature controlled for loading the temperature control space, a control device to adapt parameters which influence the temperature control operation based on a loading of the temperature control space, the loading of the temperature control space comprising a number of objects to be temperature controlled.

11. The apparatus as claimed in claim 10, wherein the overall volumetric flow is controlled by at least one control unit which controls a rotational speed of a fan, a position of a throttle valve, a position of an air guiding valve and/or a position of a bypass valve.

12. The apparatus as claimed in claim 1, wherein the adaptation of the parameters which influence the temperature control operation takes place in a stepped manner which is dependent on a number of objects to be temperature controlled, the surface area of coating to be dried, or the quantity of coating to be dried.

13. A coating plant for coating objects, having an apparatus for the temperature control of objects as claimed in claim 1.

* * * * *